United States Patent
Nakayama

(10) Patent No.: US 9,425,633 B2
(45) Date of Patent: Aug. 23, 2016

(54) SODIUM ION BATTERY SYSTEM, METHOD FOR USING SODIUM ION BATTERY, AND METHOD FOR PRODUCING SODIUM ION BATTERY

(71) Applicant: Hideki Nakayama, Toyota (JP)

(72) Inventor: Hideki Nakayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 117 days.

(21) Appl. No.: 14/044,966

(22) Filed: Oct. 3, 2013

(65) Prior Publication Data
US 2014/0097801 A1    Apr. 10, 2014

(30) Foreign Application Priority Data
Oct. 9, 2012   (JP) ................... 2012-224461

(51) Int. Cl.
*H01M 10/058* (2010.01)
*H02J 7/00* (2006.01)
(Continued)

(52) U.S. Cl.
CPC ............ *H02J 7/0052* (2013.01); *C01G 23/005* (2013.01); *H01M 4/485* (2013.01); *H01M 10/054* (2013.01); *H01M 10/44* (2013.01); *C01P 2002/72* (2013.01); *C01P 2004/03* (2013.01); *H01M 10/058* (2013.01); *Y02E 60/122* (2013.01); *Y10T 29/49108* (2015.01)

(58) Field of Classification Search
CPC . H01M 10/054; H01M 10/425; H01M 10/44; H01M 10/48; H01M 2/34; H01M 10/485; H02J 7/0052; H02J 7/007; C01P 2002/72; C01P 2004/03

USPC .......................................................... 429/221
See application file for complete search history.

(56) References Cited

U.S. PATENT DOCUMENTS

2010/0248001 A1   9/2010   Kuze et al.
2010/0261061 A1   10/2010  Yuasa et al.
(Continued)

FOREIGN PATENT DOCUMENTS

CN           1630126 A       6/2005
JP        A-2007-48682       2/2007
(Continued)

OTHER PUBLICATIONS

English translation of JP 2012085374 A, Apr. 2012, Japan, Suzuki.*
(Continued)

*Primary Examiner* — Jonathan Jelsma
*Assistant Examiner* — Rashid Alam
(74) *Attorney, Agent, or Firm* — Oliff PLC

(57) ABSTRACT

The problem of the present invention is to provide a sodium ion battery system capable of intending higher capacity. The present invention solves the above-mentioned problem by providing a sodium ion battery system comprising a sodium ion battery and a charge control unit, wherein the anode active material is an active material having an $Na_2Ti_6O_{13}$ crystal phase, and the above-mentioned charge control unit controls electric current and electric potential of the above-mentioned anode active material so as to cause a second Na insertion reaction on the lower electric potential side in addition to a first Na insertion reaction in the above-mentioned $Na_2Ti_6O_{13}$ crystal phase.

6 Claims, 3 Drawing Sheets

(51) Int. Cl.
*H01M 10/44* (2006.01)
*H01M 4/485* (2010.01)
*H01M 10/054* (2010.01)
*C01G 23/00* (2006.01)

(56) References Cited

U.S. PATENT DOCUMENTS

| | | | |
|---|---|---|---|
| 2011/0311868 A1* | 12/2011 | Sano | C01B 25/45 |
| | | | 429/211 |
| 2012/0176093 A1 | 7/2012 | Ramasubramanian et al. | |
| 2012/0208092 A1 | 8/2012 | Ku et al. | |
| 2012/0328936 A1 | 12/2012 | Wessells et al. | |
| 2014/0011096 A1 | 1/2014 | Moc et al. | |
| 2014/0287302 A1 | 9/2014 | Fukunaga et al. | |

FOREIGN PATENT DOCUMENTS

| | | |
|---|---|---|
| JP | A-2007-048692 | 2/2007 |
| JP | 2008-103091 A | 5/2008 |
| JP | 2008-103094 A | 5/2008 |
| JP | A-2009-117259 | 5/2009 |
| JP | 2010-123424 A | 6/2010 |
| JP | A-2011-49126 | 3/2011 |
| JP | 2012085374 A * | 4/2012 |
| JP | 2014-502414 A | 1/2014 |
| JP | 2014-029842 A | 2/2014 |
| WO | 2013/069597 A1 | 5/2013 |

OTHER PUBLICATIONS

N.D. Trinh et al.,"Synthesis, Characterization and electrochemical Studies of Active Materials for Sodium Ion Batteries," ECS Transactions, 35(32), 91-98 (2011).
Trinh et al., "Synthesis, Characterization and Electrochemical Studies of Active Materials for Sodium Ion Batteries," *ECS Transactions*, 2011, pp. 91-98, vol. 35, No. 32, The Electrochemical Society.
Perez-Flores et al., "On the Mechanism of Lithium Insertion into $A_2Ti_6O_{13}$(A=Na, Li)," *ECS Transactions*, 2012, pp. 195-206, vol. 41, No. 41, The Electrochemical Society.
Apr. 4, 2016 Office Action issued in U.S. Appl. No. 14/045,307.
http://www.unitconversion.org/length/angstroms-to-nanometers-conversion.html.
U.S. Appl. No. 14/045,307, filed Oct. 3, 2013.

* cited by examiner

SODIUM ION BATTERY SYSTEM, METHOD FOR USING SODIUM ION BATTERY, AND METHOD FOR PRODUCING SODIUM ION BATTERY

TECHNICAL FIELD

The present invention relates to a sodium ion battery system capable of intending higher capacity.

BACKGROUND ART

A sodium ion battery is a battery such that an Na ion moves between a cathode and an anode. Na exists so abundantly as compared with Li that the sodium ion battery has the advantage that lower costs are easily intended as compared with a lithium ion battery. Generally, the sodium ion battery has a cathode active material layer containing a cathode active material, an anode active material layer containing an anode active material, and an electrolyte layer formed between the cathode active material layer and the anode active material layer.

$Na_2Ti_6O_{13}$ is known as the anode active material used for the sodium ion battery. For example, the sodium ion battery using $Na_2TiO_{13}$ for the anode active material is disclosed in N. D. Trinh et al., "Synthesis, Characterization and Electrochemical Studies of Active Materials for Sodium Ion Batteries", ECS Transactions, 35 (32) 91-98 (2011). Also, although not the sodium ion battery, the lithium ion battery using $Na_2Ti_6O_{13}$ for the anode active material is disclosed in J. C. Perez-Flores et al., "On the Mechanism of Lithium Insertion into $A_2Ti_6O_{13}$ (A=Na, Li)", ECS Transactions, 41 (41) 195-206 (2012). The same description is given also in Prior Art of Japanese Patent Application Publication (JP-A) No. 2009-117259. Also, the sodium ion battery using lithium titanate ($Li_4Ti_5O_{12}$) for the anode active material is disclosed in JP-A No. 2011-049126. Also, it is disclosed in JP-A No. 2007-048682 that an active material and a carbon material are composited by a ball mill.

SUMMARY OF INVENTION

Technical Problem

The sodium ion battery using $Na_2Ti_6O_{13}$ for the anode active material is disclosed in N. D. Trinh et al., "Synthesis, Characterization and Electrochemical Studies of Active Materials for Sodium Ion Batteries", ECS Transactions, 35 (32) 91-98 (2011). However, as shown in FIG. 8, this battery is as low as approximately 27% in initial charge and discharge efficiency, and as low as approximately 20 mAh/g also in reversible capacitance.

The present invention has been made in view of the above-mentioned actual circumstances, and the main object thereof is to provide a sodium ion battery system capable of intending higher capacity.

Solution to Problem

In order to achieve the above-mentioned problems, the present invention provides a sodium ion battery system comprising: a sodium ion battery having a cathode active material layer containing a cathode active material, an anode active material layer containing an anode active material, and an electrolyte layer formed between the above-mentioned cathode active material layer and the above-mentioned anode active material layer; and a charge control unit, wherein the above-mentioned anode active material is an active material having an $Na_2Ti_6O_{13}$ crystal phase, and the above-mentioned charge control unit controls electric current and electric potential of the above-mentioned anode active material so as to cause a second Na insertion reaction on the lower electric potential side in addition to a first Na insertion reaction in the above-mentioned $Na_2Ti_6O_{13}$ crystal phase.

According to the present invention, higher capacity may be intended by controlling the charging conditions so as to cause the second Na insertion reaction on the lower electric potential side than the $Na_2Ti_6O_{13}$ crystal phase.

In the above-mentioned invention, the above-mentioned charge control unit preferably controls the above-mentioned electric current to 6 mA/g or less.

In the above-mentioned invention, the above-mentioned charge control unit preferably controls the above-mentioned electric potential of the anode active material to 0.1 V (vs Na/Na$^+$) or less.

In the above-mentioned invention, the anode active material is preferably composited with a conductive material.

Also, the present invention provides a method for using a sodium ion battery having a cathode active material layer containing a cathode active material, an anode active material layer containing an anode active material and an electrolyte layer formed between the above-mentioned cathode active material layer and the above-mentioned anode active material layer, the method comprising a step of charging while controlling electric current and electric potential of the above-mentioned anode active material so as to cause a second Na insertion reaction on the lower electric potential side in addition to a first Na insertion reaction in the above-mentioned $Na_2Ti_6O_{13}$ crystal phase.

According to the present invention, higher capacity of the sodium ion battery may be intended by charging so as to cause the second Na insertion reaction on the lower electric potential side than the $Na_2Ti_6O_{13}$ crystal phase.

Also, the present invention provides a method for producing a sodium ion battery having a cathode active material layer containing a cathode active material, an anode active material layer containing an anode active material, and an electrolyte layer formed between the above-mentioned cathode active material layer and the above-mentioned anode active material layer, the method comprising a charging step of charging while controlling electric current and electric potential of the above-mentioned anode active material so as to cause a second Na insertion reaction on the lower electric potential side in addition to a first Na insertion reaction in the above-mentioned $Na_2Ti_6O_{13}$ crystal phase.

According to the present invention, the sodium ion battery with higher capacity may be obtained by charging so as to cause the second Na insertion reaction on the lower electric potential side than the $Na_2Ti_6O_{13}$ crystal phase.

Advantageous Effects of Invention

A sodium ion battery system of the present invention produces the effect such as to allow higher capacity to be intended.

DESCRIPTION OF EMBODIMENTS

A sodium ion battery system, a method for using a sodium ion battery and a method for producing a sodium ion battery of the present invention are hereinafter described in detail.

A. Sodium Ion Battery System

The sodium ion battery system of the present invention is a sodium ion battery system comprising: a sodium ion battery having a cathode active material layer containing a cathode active material, an anode active material layer containing an anode active material, and an electrolyte layer formed between the above-mentioned cathode active material layer and the above-mentioned anode active material layer; and a charge control unit, wherein the above-mentioned anode active material is an active material having an $Na_2Ti_6O_{13}$ crystal phase, and the above-mentioned charge control unit controls electric current and electric potential of the above-mentioned anode active material so as to cause a second Na insertion reaction on the lower electric potential side in addition to a first Na insertion reaction in the above-mentioned $Na_2Ti_6O_{13}$ crystal phase.

Figure 1:
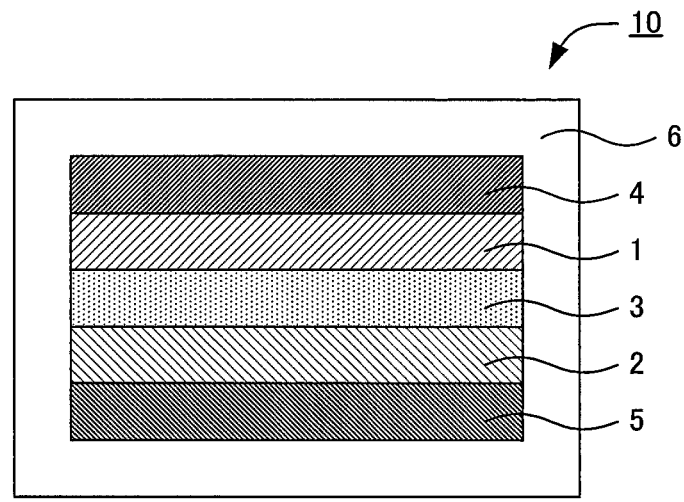
FIG. 1 is a schematic cross-sectional view showing an example of a sodium ion battery in the present invention.

FIG. 1 is a schematic cross-sectional view showing an example of the sodium ion battery in the present invention. A sodium ion battery 10 shown in FIG. 1 comprises a cathode active material layer 1, an anode active material layer 2, an electrolyte layer 3 formed between the cathode active material layer 1 and the anode active material layer 2, a cathode current collector 4 for collecting the cathode active material layer 1, an anode current collector 5 for collecting the anode active material layer 2, and a battery case 6 for storing these members. In the present invention, the anode active material contained in the anode active material layer 2 is an active material having an $Na_2Ti_6O_{13}$ crystal phase.

Figure 2:
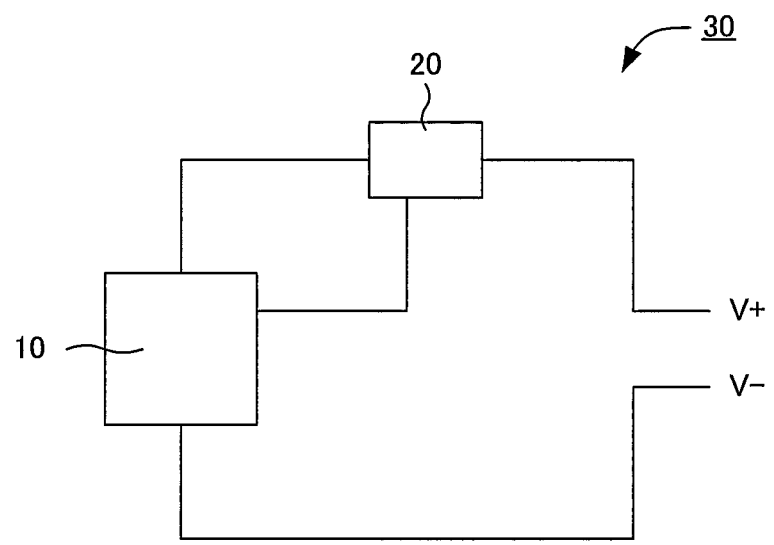
FIG. 2 is a schematic view showing an example of a sodium ion battery system of the present invention.

FIG. 2 is a schematic view showing an example of the sodium ion battery system of the present invention. As shown in FIG. 2, a sodium ion battery system 30 of the present invention comprises the sodium ion battery 10 and a charge control unit 20. The charge control unit 20 controls electric current and electric potential of the anode active material so as to cause the second Na insertion reaction on the lower electric potential side in addition to the first Na insertion reaction in the $Na_2Ti_6O_{13}$ crystal phase. Na is inserted into the anode active material having an $Na_2Ti_6O_{13}$ crystal phase in charging, and electric potential of the anode active material (electric potential on the basis of Na) lowers. The charge control unit in the present invention controls electric current and electric potential of the anode active material so as to cause the second Na insertion reaction in the $Na_2Ti_6O_{13}$ crystal phase in charging. Specifically, electric potential of the anode active material is lowered sufficiently by sufficiently low electric current.

According to the present invention, higher capacity may be intended by controlling the charging conditions so as to cause the second Na insertion reaction on the lower electric potential side than the $Na_2Ti_6O_{13}$ crystal phase. That is to say, the utilization of the second Na insertion reaction (in the vicinity of 0.1 V) in addition to the first Na insertion reaction (in the vicinity of 0.8 V) allows further capability of the $Na_2Ti_6O_{13}$ crystal phase to be brought out, and allows higher capacity to be intended. Incidentally, the second Na insertion reaction (in the vicinity of 0.1 V) is a reaction which has not been conventionally known at all.

Here, the $Na_2Ti_6O_{13}$ crystal phase is a crystal phase having a tunnel structure comprising a $TiO_6$ octahedron. Also, in the $Na_2Ti_6O_{13}$ crystal phase, it is conceived that x=1 is a limit in $Na_xNa_2Ti_6O_{13}$ in consideration of a site at which an Na ion may be inserted and extracted. On the contrary, in the present invention, it has been unexpectedly found out that a gradual insertion of Na into the $Na_2Ti_6O_{13}$ crystal phase by sufficiently low electric current allows an Na ion to be further inserted into the $Na_2Ti_6O_{13}$ crystal phase. The reason therefor is conceived to be probably that a gradual insertion of an Na ion changes the crystal structure of the $Na_2Ti_6O_{13}$ crystal phase gradually. That is to say, it is conceived that the first Na insertion reaction is a reaction such as to insert an Na ion while maintaining the mother structure of the crystal, whereas the second Na insertion reaction is a reaction such as to insert an Na ion while changing the mother structure of the crystal. In the present invention, the utilization of such a special Na insertion reaction allows higher capacity to be substantially intended as compared with a conventional situation.

The sodium ion battery system of the present invention is hereinafter described in each constitution.

1. Sodium Ion Battery

The sodium ion battery in the present invention comprises at least an anode active material layer, a cathode active material layer, and an electrolyte layer.

(1) Anode Active Material Layer

First, the anode active material layer in the present invention is described. The anode active material layer in the present invention is a layer containing at least the anode active material. Also, the anode active material layer may contain at least one of a conductive material, a binder and a solid electrolyte material in addition to the anode active material.

(i) Anode Active Material

The anode active material in the present invention ordinarily has the $Na_2Ti_6O_{13}$ crystal phase. Incidentally, "$Na_2Ti_6O_{13}$ crystal phase" in the present invention is a concept of including such that part of Ti in the $Na_2Ti_6O_{13}$ crystal phase is substituted with another element, as described later. The presence of the $Na_2Ti_6O_{13}$ crystal phase may be confirmed by X-ray diffraction (XRD) measurement. For example, a CuKα ray may be used for the XRD measurement. The above-mentioned anode active material preferably has a peak in a position of 2θ=11.8°, 14.1°, 24.5°, 29.8°, 30.1°, 30.5°, 32.2°, 33.5°, 43.3°, 44.3° and 48.6°, for example. Incidentally, these peak positions are actual measurement values obtained in the after-mentioned examples, and may fluctuate within a range of ±0.5°.

Also, the above-mentioned anode active material is preferably large in the ratio of the $Na_2Ti_6O_{13}$ crystal phase; specifically, the anode active material preferably contains the $Na_2Ti_6O_{13}$ crystal phase mainly. Here, "containing the $Na_2Ti_6O_{13}$ crystal phase mainly" signifies that the ratio of the $Na_2Ti_6O_{13}$ crystal phase is the largest in all crystal phases contained in the above-mentioned anode active material. The ratio of the $Na_2Ti_6O_{13}$ crystal phase contained in the above-mentioned anode active material is preferably 50 mol % or more, more preferably 60 mol % or more, and far more preferably 70 mol % or more. Also, the above-mentioned anode active material may be such as to be composed of only the $Na_2Ti_6O_{13}$ crystal phase (a single-phase active material). Incidentally, the ratio of the $Na_2Ti_6O_{13}$ crystal phase contained in the above-mentioned anode active material may be determined by a quantitative analysis method through X-ray diffraction (such as a quantification method by R-value and a Rietveld method).

Also, in the case where a peak intensity of 2θ=11.8° in the $Na_2Ti_6O_{13}$ crystal phase is regarded as $I_A$ and a peak intensity of 2θ=25.2° in titanium oxide is regarded as $I_B$, the value of $I_B/I_A$ is preferably 0.1 or less, and more preferably 0.01 or less. Incidentally, $I_B$ may be 0.

The crystallite size of the $Na_2Ti_6O_{13}$ crystal phase is, for example, 190 Å or more, preferably 240 Å or more, and more preferably 250 Å or more. The reason therefor is that too small crystallite size of the $Na_2Ti_6O_{13}$ crystal phase brings a possibility of increasing the ratio of an unnecessary crystal phase (such as a crystal phase derived from a raw material). For example, in the case of synthesizing an active material with a small crystallite size of the $Na_2Ti_6O_{13}$ crystal phase by a solid-phase method, it is necessary to lower burning temperature and shorten burning time. As a result, there is a possibility of increasing the ratio of a crystal phase derived from a raw material such as titanium oxide, and a possibility of not allowing the improvement of charge and discharge efficiency to be sufficiently intended.

On the other hand, the crystallite size of the $Na_2Ti_6O_{13}$ crystal phase is ordinarily 520 Å or less, preferably 510 Å or less, and more preferably 500 Å or less. The reason therefor is that too large crystallite size of the $Na_2Ti_6O_{13}$ crystal phase brings a possibility of deteriorating charge and discharge efficiency. Examples of the reason for deteriorating charge and discharge efficiency include lengthening of an Na ion conduction path and an electron conduction path, and the decrease of a reaction active site in accordance with the decrease of a specific surface area. Incidentally, in N. D. Trinh et al., "Synthesis, Characterization and Electrochemical Studies of Active Materials for Sodium Ion Batteries", ECS Transactions, 35 (32) 91-98 (2011), on the occasion of synthesizing $Na_2Ti_6O_{13}$, burning is performed at a temperature of 800° C. for one day, and thereafter burning is performed at a temperature of 930° C. for three days. These burning conditions are such that burning temperature is high and burning time is long as compared with the burning conditions in the after-mentioned examples. Thus, the crystallite size of the $Na_2Ti_6O_{13}$ is larger than the crystallite size in the present invention.

Also, the crystallite size of the $Na_2Ti_6O_{13}$ crystal phase may be calculated from a half-value width of a peak obtained by the XRD measurement. For example, the crystallite size may be calculated by the Scherrer's formula with the use of full width at half maximum (FWHM) of the above-mentioned peak of 2θ=11.8°.

$$D=K\lambda/(\beta \cos \theta)$$

K: Scherrer constant, λ: wavelength, β: spread of diffraction line by size of crystallite, θ: angle of diffraction 2θ/θ

Figure 5:
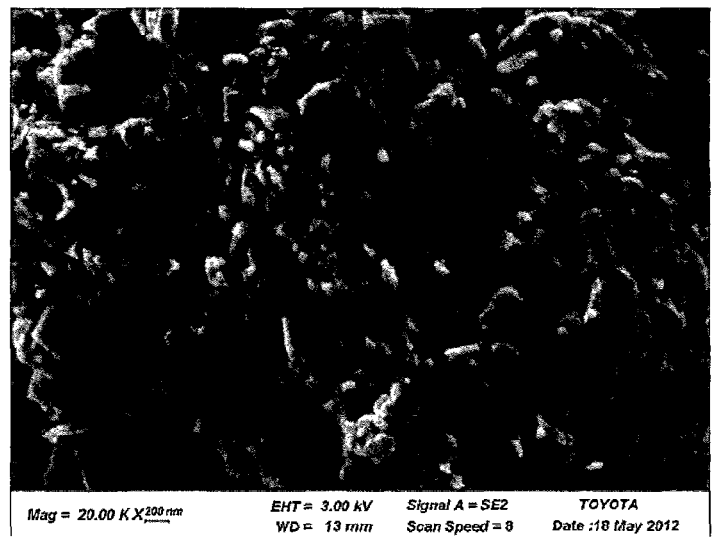
FIG. 5 is a result of observing SEM of an active material obtained in Example 2.

Incidentally, it is difficult to accurately calculate the crystallite size of the $Na_2Ti_6O_{13}$ from the XRD pattern shown in FIG. 5 of N. D. Trinh et al., "Synthesis, Characterization and Electrochemical Studies of Active Materials for Sodium Ion Batteries", ECS Transactions, 35 (32) 91-98 (2011), but the peak is so remarkable that the crystallite size is guessed to be approximately a little less than 1 µm.

Also, in the present invention, part of Ti in the $Na_2Ti_6O_{13}$ crystal phase may be substituted with M (M is at least one of Fe, V, Mn, Mo, Al, Cr, Mg, Nb, W, Zr, Ta and Sn). The substitution of Ti with M allows the improvement of rate characteristic to be intended. The reason why rate characteristic improves is not necessarily clear but guessed to be that the substitution of part of Ti with M improves electron conductivity of an active material. Incidentally, the ionic radius of an element represented by M is close to the ionic radius of Ti. M is preferably at least one of Fe, V, Mn and W, particularly preferably Fe. Also, M preferably has a valence number different from the valence number (quadrivalence) of Ti. Specifically, M preferably has a valence number of trivalence or pentavalence. The reason therefor is that the introduction of M different in valence number from Ti brings an effect such as an n-type semiconductor or a p-type semiconductor to easily improve electron conductivity.

The substituted amount of M (M/(M+Ti)) is not particularly limited but is, for example, preferably 0.1 at % or more, and more preferably 0.5 at % or more. The reason therefor is that too small substituted amount of M brings a possibility of not sufficiently improving rate characteristic. On the other hand, the substituted amount of M (M/(M+Ti)) is, for example, preferably 20 at % or less, and more preferably 10 at % or less. The reason therefor is that too large substituted amount of M brings a possibility of changing the crystal structure. Incidentally, the substituted amount of M may be measured by ICP, for example.

With regard to the above-mentioned anode active material, Na insertion electric potential into metallic Na is preferably 1.0 V or less, and more preferably within a range of 0.5 V to 1.0 V. The reason therefor is that too low Na insertion electric potential brings a possibility that metallic Na may not sufficiently be inhibited from precipitating, whereas too high Na insertion electric potential brings a possibility that battery voltage decreases. In the present invention, Na insertion electric potential of the above-mentioned anode active material may be determined by a cyclic voltammetry (CV) method.

The above-mentioned anode active material is preferably composited with a conductive material. The reason therefor is to allow the improvement of rate characteristic to be intended. The conductive material to be composited is not particularly limited if the conductive material is such as to have desired electron conductivity, but examples thereof include a carbon material and a metallic material, and preferably a carbon material among them. Examples of the carbon material include carbon black such as acetylene black, Ketjen Black, furnace black and thermal black; carbon fiber such as VGCF; graphite; hard carbon; and coke. Examples of the metallic material include Fe, Cu, Ni and Al. "The anode active material and the conductive material are composited" ordinarily signifies a state obtained by subjecting both of them to mechanochemical treatment. Examples thereof include a state such that both of them are dispersed so as to be closely stuck to each other in a nano order, and a state such that one is dispersed so as to be closely stuck to the surface of the other in a nano order. Incidentally, a chemical bond may exist between both of them. To be composited may be confirmed by SEM observation, TEM observation, TEM-EELS method and X-ray absorption fine structure (XAFS), for example. Also, examples of the mechanochemical treatment include treatment such as to allow mechanical energy, such as a ball mill. Also, a commercially available composite device (such as Nobilta™ manufactured by Hosokawa Micron Corp.) may be used.

Also, in the case where the above-mentioned anode active material is composited with the conductive material, the ratio of the composited conductive material is, for example, preferably within a range of 1% by weight to 30% by weight, and more preferably within a range of 5% by weight to 20% by weight. The reason therefor is that too small ratio of the composited conductive material brings a possibility of not allowing the improvement of rate characteristic to be sufficiently intended, whereas too large ratio of the composited conductive material brings a possibility of relatively decreasing the amount of the active material to reduce the capacity. In the case where the composited conductive material is the carbon material, crystallinity of the carbon material is preferably high. Specifically, as described later, the carbon material is preferably composited so that interlayer distance d002 or D/G ratio becomes a predetermined value.

The shape of the above-mentioned anode active material is preferably a particulate shape, for example. Also, the average particle diameter thereof ($D_{50}$) is preferably, for example within a range of 1 nm to 100 μm, and above all within a range of 10 nm to 30 μm.

Also, a method for producing the above-mentioned anode active material is not particularly limited if the method is such as to allow the above-mentioned active material, but examples thereof include a solid-phase method. Specific examples of the solid-phase method include a method for preparing a raw material composition in which an Na source (such as sodium carbonate) and a Ti source (such as titanium oxide) are mixed at a predetermined ratio to burn the raw material composition. Also, the crystallite size may be controlled by adjusting burning temperature and burning time, for example. In the case where burning temperature is high and burning time is long, the crystallite size tends to enlarge. The burning temperature is, for example, preferably within a range of 700° C. to 900° C., and more preferably within a range of 750° C. to 850° C. The reason therefor is that too low burning temperature brings a possibility of not causing a solid-phase reaction, whereas too high burning temperature brings a possibility of producing an unnecessary crystal phase. The burning time is, for example, preferably within a range of 20 hours to 80 hours, and more preferably within a range of 40 hours to 60 hours. The atmosphere of burning is not particularly limited but may be an atmosphere in which oxygen exists, an inert gas atmosphere, or a decompression (vacuum) atmosphere.

(ii) Conductive Material

The anode active material layer in the present invention preferably contains the conductive material. The conductive material may be such as to be composited with the above-mentioned anode active material, such as not to be composited but to exist in a mixed state with the anode active material in the anode active material layer, or both of them. The conductive material is not particularly limited if the conductive material is such as to have desired electron conductivity, but is the same as the contents described in the above-mentioned "(i) Anode active material". Above all, in the present invention, crystallinity of the carbon material is preferably high, specifically preferably graphite or VGCF. The reason therefor is that crystallinity of the carbon material is so high that an Na ion is inserted into the carbon material with difficulty and irreversible capacitance due to Na ion insertion may be decreased. As a result, the improvement of charge and discharge efficiency may be further intended. The crystallinity of the carbon material may be prescribed by interlayer distance d002 and D/G ratio, for example.

With regard to the above-mentioned carbon material, the interlayer distance d002 is, for example, preferably 3.54 Å or less, more preferably 3.50 Å or less, and far more preferably 3.40 Å or less. The reason therefor is to allow the carbon material with high crystallinity. On the other hand, the interlayer distance d002 is ordinarily 3.36 Å or more. The interlayer distance d002 signifies interplanar spacing of (002) plane in the carbon material, and specifically corresponds to a distance between graphene layers. The interlayer distance d002 may be measured from a peak obtained by an X-ray diffraction (XRD) method with the use of a CuKα ray, for example.

With regard to the above-mentioned carbon material, the D/G ratio measured by Raman spectroscopy measurement is, for example, preferably 0.90 or less, more preferably 0.80 or less, far more preferably 0.50 or less, and particularly preferably 0.20 or less. The reason therefor is to allow the carbon material with high crystallinity. The D/G ratio signifies peak intensity of D-band derived from a defect structure in the vicinity of 1350 $cm^{-1}$ with respect to peak intensity of G-band derived from a graphite structure in the vicinity of 1590 $cm^{-1}$, which are observed in Raman spectroscopy measurement (a wavelength of 532 nm).

(iii) Anode Active Material Layer

The anode active material layer in the present invention may contain the binder. The binder is not particularly limited if the binder is such as to be stable chemically and electrically, but examples thereof include fluorine-based binders such as polyvinylidene fluoride (PVDF) and polytetrafluoroethylene (PTFE), rubber-based binders such as styrene-butadiene rubber, olefin-based binders such as polypropylene (PP) and polyethylene (PE), and cellulose-based binders such as carboxymethyl cellulose (CMC). Also, the solid electrolyte material is not particularly limited if the material is such as to have desired ion conductivity, but examples thereof include an oxide based solid electrolyte material and a sulfide solid electrolyte material. Incidentally, the solid electrolyte material is described in detail in the after-mentioned "(3). Electrolyte layer".

The content of the anode active material in the anode active material layer is preferably larger from the viewpoint of capacity; preferably, for example within a range of 60% by weight to 99% by weight, above all within a range of 70% by weight to 95% by weight. Also, the content of the conductive material is preferably smaller if the material may secure desired electron conductivity; preferably, for example within a range of 5% by weight to 80% by weight, above all within a range of 10% by weight to 40% by weight. The reason therefor is that too small content of the conductive material brings a possibility of not allowing sufficient electron conductivity, whereas too large content of the conductive material brings a possibility of relatively decreasing the amount of the active material to reduce the capacity. Also, the content of the binder is preferably smaller if the binder may stably fix the anode active material; preferably, for example within a range of 1% by weight to 40% by weight. The reason therefor is that too small content of the binder brings a possibility of not allowing sufficient binding property, whereas too large content of the binder brings a possibility of relatively decreasing the amount of the active material to reduce the capacity. Also, the content of the solid electrolyte material is preferably smaller if the material may secure desired ion conductivity; preferably, for example within a range of 1% by weight to 40% by weight. The reason therefor is that too small content of the solid electrolyte material brings a possibility of not allowing sufficient ion conductivity, whereas too large content of the solid electrolyte material brings a possibility of relatively decreasing the amount of the active material to reduce the capacity.

Also, the thickness of the anode active material layer varies greatly with the constitution of the battery, and is preferably within a range of 0.1 μm to 1,000 μm, for example.

(2) Cathode Active Material Layer

Next, the cathode active material layer in the present invention is described. The cathode active material layer in the present invention is a layer containing at least the cathode active material. Also, the cathode active material layer may contain at least one of a conductive material, a binder and a solid electrolyte material in addition to the cathode active material.

Examples of the cathode active material include bed type active materials, spinel type active materials, and olivine type active materials. Specific examples of the cathode active material include $NaFeO_2$, $NaNiO_2$, $NaCoO_2$, $NaMnO_2$, $NaVO_2$, $Na(Ni_xMn_{1-x})O_2$ (0<X<1), $Na(Fe_xMn_{1-x})O_2$ (0<X<1), $NaVPO_4F$, $Na_2FePO4F$, and $Na_3V_2(PO_4)_3$.

The shape of the cathode active material is preferably a particulate shape. Also, the average particle diameter of the cathode active material ($D_{50}$) is preferably, for example within a range of 1 nm to 100 μm, and above all within a range of 10 nm to 30 μm. The content of the cathode active material in the cathode active material layer is preferably larger from the viewpoint of capacity; preferably, for example within a range of 60% by weight to 99% by weight, and above all within a range of 70% by weight to 95% by weight. Incidentally, the kinds and content of the conductive material, the binder and the solid electrolyte material used for the cathode active material layer are the same as the contents described in the above-mentioned anode active material layer; therefore, the description herein is omitted. Also, the thickness of the cathode active material layer varies greatly with the constitution of the battery, and is preferably within a range of 0.1 μm to 1,000 μm, for example.

(3) Electrolyte Layer

Next, the electrolyte layer in the present invention is described. The electrolyte layer in the present invention is a layer formed between the above-mentioned cathode active material layer and the above-mentioned anode active material layer. Ion conduction between the cathode active material and the anode active material is performed through the electrolyte contained in the electrolyte layer. The form of the electrolyte layer is not particularly limited but examples thereof include a liquid electrolyte layer, a gel electrolyte layer and a solid electrolyte layer.

The liquid electrolyte layer is ordinarily a layer obtained by using a nonaqueous liquid electrolyte. The nonaqueous liquid electrolyte ordinarily contains a sodium salt and a nonaqueous solvent. Examples of the sodium salt include inorganic sodium salts such as $NaPF_6$, $NaBF_4$, $NaClO_4$ and $NaAsF_6$; and organic sodium salts such as $NaCF_3SO_3$, $NaN(CF_3SO_2)_2$, $NaN(C_2F_5SO_2)_2$, $NaN(FSO_2)_2$ and $NaC(CF_3SO_2)_3$. The nonaqueous solvent is not particularly limited if the solvent is such as to dissolve the sodium salt. Examples of the high-dielectric-constant solvent include cyclic ester (cyclic carbonate) such as ethylene carbonate (EC), propylene carbonate (PC) and butylene carbonate (BC), γ-butyrolactone, sulfolane, N-methylpyrrolidone (NMP), and 1,3-dimethyl-2-imidazolidinone (DMI). On the other hand, examples of the low-viscosity solvent include chain ester (chain carbonate) such as dimethyl carbonate (DMC), diethyl carbonate (DEC) and ethyl methyl carbonate (EMC), acetate such as methyl acetate and ethyl acetate, and ether such as 2-methyltetrahydrofuran. A mixed solvent such that the high-dielectric-constant solvent and the low-viscosity solvent are mixed may be used. The concentration of the sodium salt in the nonaqueous liquid electrolyte is, for example, within a range of 0.3 mol/L to 5 mol/L, and preferably within a range of 0.8 mol/L to 1.5 mol/L. The reason therefor is that too low concentration of the sodium salt brings a possibility of causing capacity reduction during high rate, whereas too high concentration of the sodium salt brings a possibility of increasing viscosity to cause capacity reduction at low temperature. Incidentally, in the present invention, a low-volatile liquid such as an ionic liquid may be used as the nonaqueous liquid electrolyte.

The gel electrolyte layer may be obtained by adding and gelating a polymer to a nonaqueous liquid electrolyte, for example. Specifically, gelation may be performed by adding polymers such as polyethylene oxide (PEO), polyacrylonitrile (PAN) or polymethyl methacrylate (PMMA) to a nonaqueous liquid electrolyte.

The solid electrolyte layer is a layer obtained by using the solid electrolyte material. The solid electrolyte material is not particularly limited if the material is such as to have Na ion conductivity, but examples thereof include an oxide based solid electrolyte material and a sulfide solid electrolyte material. Examples of the oxide based solid electrolyte material include $Na_3Zr_2Si_2PO_{12}$ and β-alumina solid electrolyte (such as $Na_2O\text{-}11Al_2O_3$). Examples of the sulfide solid electrolyte material include $Na_2S\text{---}P_2S_5$.

The solid electrolyte material in the present invention may be amorphous or crystalline. Also, the shape of the solid electrolyte material is preferably a particulate shape. Also, the average particle diameter of the solid electrolyte material ($D_{50}$) is preferably, for example within a range of 1 nm to 100 μm, and above all within a range of 10 nm to 30 μm.

The thickness of the electrolyte layer varies greatly with kinds of the electrolyte and constitutions of the battery, and is preferably, for example within a range of 0.1 μm to 1,000 μm, and above all within a range of 0.1 μm to 300 μm.

(4) Other Constitutions

The sodium ion battery in the present invention has at least the above-mentioned anode active material layer, cathode active material layer and electrolyte layer, ordinarily further having a cathode current collector for collecting the cathode active material layer and an anode current collector for collecting the anode active material layer. Examples of a material for the cathode current collector include SUS, aluminum, nickel, iron, titanium and carbon. On the other hand, examples of a material for the anode current collector include SUS, copper, nickel and carbon. Also, examples of the shape of the cathode current collector and the anode current collector include a foil shape, a mesh shape and a porous shape.

The sodium ion battery in the present invention may have a separator between the cathode active material layer and the anode active material layer. The reason therefor is to allow the battery with higher safety. Examples of a material for the separator include porous membranes such as polyethylene (PE), polypropylene (PP), cellulose and polyvinylidene fluoride; and nonwoven fabrics such as resin nonwoven fabric and glass fiber nonwoven fabric. Also, the separator may be a single-layer structure (such as PE and PP) or a laminated structure (such as PP/PE/PP). Also, a battery case of a general battery may be used for a battery case used for the present invention. Examples of the battery case include a battery case made of SUS.

(5) Sodium Ion Battery

The sodium ion battery in the present invention is not particularly limited if the battery is such as to have the above-mentioned cathode active material layer, anode active material layer and electrolyte layer. Also, the sodium ion battery in the present invention may be a battery in which the electrolyte layer is the solid electrolyte layer, a battery in which the electrolyte layer is the liquid electrolyte layer, or a battery in which the electrolyte layer is the gel electrolyte layer. In addition, the sodium ion battery in the present invention may be a primary battery or a secondary battery, and preferably a secondary battery among them. The reason therefor is to be repeatedly charged and discharged and be useful as a car-mounted battery, for example. Also, examples of the shape of the sodium ion battery in the present invention include a coin shape, a laminate shape, a cylindrical shape and a rectangular shape. Also, a producing method for the sodium ion battery is not particularly limited but is the same as a producing method for a general sodium ion battery.

2. Charge Control Unit

The charge control unit in the present invention controls electric current and electric potential of the above-mentioned anode active material so as to cause a second Na insertion reaction on the lower electric potential side in addition to a first Na insertion reaction in the above-mentioned $Na_2Ti_6O_{13}$ crystal phase.

Figure 4A:
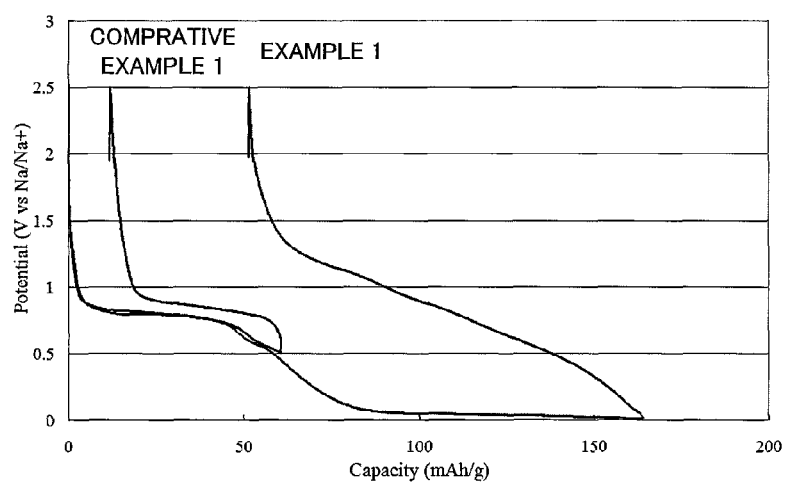
FIGS. 4A and 4B are results of a charge and discharge test of an evaluation battery in Example 1 and Comparative Examples 1 and 2.

The occurrence of the second Na insertion reaction may be confirmed by a plateau portion existing in the vicinity of 0.1V (vs $Na/Na^+$) as shown in the after-mentioned FIG. 4A. Also, the case where capacity, which is not obtained by only the first Na insertion reaction, is obtained signifies the occurrence of the second Na insertion reaction. On the other hand, in the case where capacity obtained by the first Na insertion reaction is regarded as $C_1$ and capacity obtained by the second Na insertion reaction is regarded as $C_2$, $C_2/C_1$ is, for example, preferably 0.3 or more, more preferably 0.5 or more, and far more preferably 0.7 or more.

The charge control unit in the present invention controls the electric current in charging so low as to cause the second Na insertion reaction. The electric potential of the second Na insertion reaction is as low as the vicinity of 0.1 V so as to reach 0 V before causing the second Na insertion reaction if the electric current value is too high. Specifically, the charge control unit controls the electric current to preferably 6 mA/g or less, more preferably 5 mA/g or less, and far more preferably 4 mA/g or less. The lower limit value of the electric current is not particularly limited but is 3 mA/g, for example.

The charge control unit in the present invention controls the electric potential of the anode active material in charging so low as to cause the second Na insertion reaction.

Specifically, the charge control unit controls the electric potential of the anode active material to preferably 0.1 V (vs $Na/Na^+$) or less, more preferably 10 mV (vs $Na/Na^+$) or less, and far more preferably 1 mV (vs $Na/Na^+$) or less. The lower limit value of the electric potential of the anode active material is not particularly limited but is 0.1 mV (vs $Na/Na^+$), for example.

The constitution of the charge control unit is not particularly limited but examples thereof include such as to be composed of a measuring section for measuring the electric potential of the anode active material on the basis of Na, a current control section for controlling the electric current, and a switch section for cutting off the electric current in accordance with the electric current or the electric potential of the anode active material.

B. Method for Using Sodium Ion Battery

Next, a method for using a sodium ion battery of the present invention is described. The method for using a sodium ion battery of the present invention is a method for using a sodium ion battery having a cathode active material layer containing a cathode active material, an anode active material layer containing an anode active material, and an electrolyte layer formed between the above-mentioned cathode active material layer and the above-mentioned anode active material layer, the method comprising a step of charging while controlling electric current and electric potential of the above-mentioned anode active material so as to cause a second Na insertion reaction on the lower electric potential side in addition to a first Na insertion reaction in the above-mentioned $Na_2Ti_6O_{13}$ crystal phase.

According to the present invention, higher capacity of the sodium ion battery may be intended by charging so as to cause the second Na insertion reaction on the lower electric potential side than the $Na_2Ti_6O_{13}$ crystal phase. The charging conditions are the same as the contents described in the above-mentioned "A. Sodium ion battery system". Also, an optional method known conventionally may be adopted for a method for charging.

C. Method for Producing Sodium Ion Battery

Next, a method for producing a sodium ion battery of the present invention is described. The method for producing a sodium ion battery of the present invention is a method for producing a sodium ion battery having a cathode active material layer containing a cathode active material, an anode active material layer containing an anode active material, and an electrolyte layer formed between the above-mentioned cathode active material layer and the above-mentioned anode active material layer, comprising a charging step of charging while controlling electric current and electric potential of the above-mentioned anode active material so as to cause a second Na insertion reaction on the lower electric potential side in addition to a first Na insertion reaction in the above-mentioned $Na_2Ti_6O_{13}$ crystal phase.

According to the present invention, the sodium ion battery with higher capacity may be obtained by charging so as to cause the second Na insertion reaction on the lower electric potential side than the $Na_2Ti_6O_{13}$ crystal phase. Also, the charging step changes the crystal structure of the $Na_2Ti_6O_{13}$ crystal phase to allow the sodium ion battery which is more appropriate for the insertion of an Na ion. Thus, for example, even in the case where the sodium ion battery after charging step is charged on the conditions of determining the lower limit electric potential of Na insertion at high electric potential, higher capacity may be intended. The charging conditions are the same as the contents described in the above-mentioned "A. Sodium ion battery system". Also, an optional method known conventionally may be adopted for a method for charging.

Incidentally, the present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

(Synthesis of Active Material)

Sodium carbonate ($Na_2CO_3$) and titanium oxide (anatase, $TiO_2$) were weighed as starting materials at a molar ratio of $Na_2CO_3:TiO_2=1:6$, and mixed in ethanol. Next, the ethanol was removed by drying, and the solution was molded into pellets, which were burned in a muffle furnace on the conditions of 800° C. and 60 hours. Thus, an active material having an $Na_2Ti_6O_{13}$ crystal phase was obtained.

(Production of Evaluation Battery)

An evaluation battery using the obtained active material was produced. First, the obtained active material, a conductive material (acetylene black, interlayer distance d002=3.54 Å, D/G ratio=0.87), and a binder (polyvinylidene fluoride, PVDF) were mixed and kneaded at a weight ratio of active material:conductive material:binder=85:10:5 to thereby obtain a paste. Next, the obtained paste was coated on a copper foil by a doctor blade, dried and pressed to thereby obtain a test electrode with a thickness of 20 μm.

Thereafter, a CR2032-type coin cell was used, the above-mentioned test electrode was used as a working electrode, metallic Na was used as a counter electrode, and a porous separator of polyethylene/polypropylene/polyethylene (a thickness of 25 μm) was used as a separator. A solution such that $NaPF_6$ was dissolved at a concentration of 1 mol/L in a solvent, in which EC (ethylene carbonate) and DEC (diethyl carbonate) were mixed by the same volume, was used for a liquid electrolyte. Thus, an evaluation battery was obtained.

[Evaluation 1]
(XRD Measurement)

Figure 3:
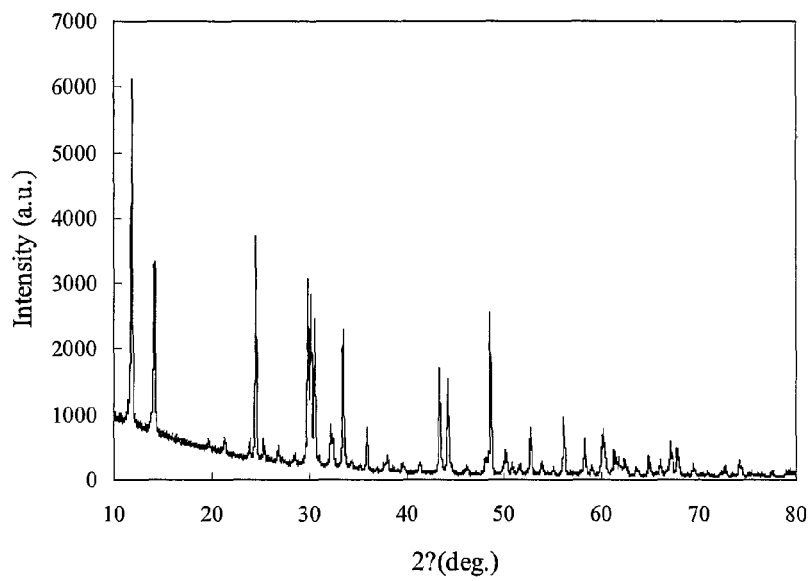
FIG. 3 is a result of measuring XRD for an active material obtained in Example 1.

X-ray diffraction (XRD) measurement by using a CuKα ray was performed for the active material obtained in Example 1. The results are shown in FIG. 3. As shown in FIG. 3, in Example 1, a typical peak which exhibits the $Na_2Ti_6O_{13}$ crystal phase was confirmed in a position of 2θ=11.8°, 14.1°, 24.5°, 29.8°, 30.1°, 30.5°, 32.2°, 33.5°, 43.3°, 44.3° and 48.6°. Also, in the case where a peak intensity of 2θ=11.8° in the $Na_2Ti_6O_{13}$ crystal phase is regarded as $I_A$ and a peak intensity of 2θ=25.2° in titanium oxide is regarded as $I_B$, the value of $I_B/I_A$ was 0.08.

(Charge and Discharge Test)

Figure 4B:
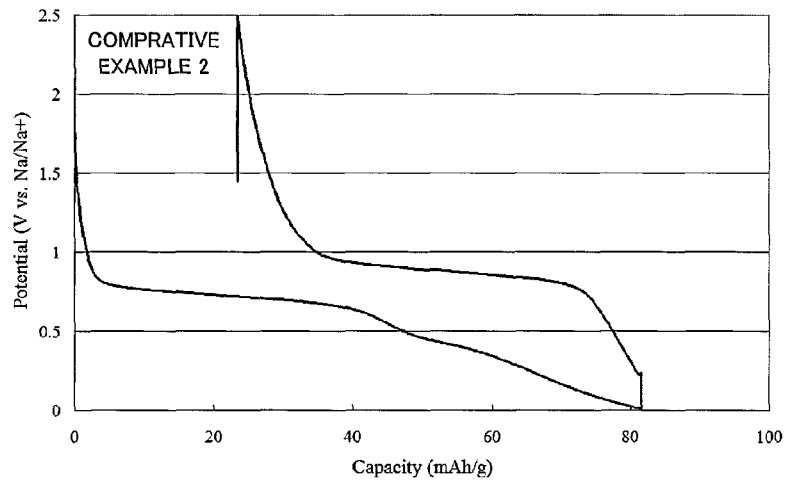

A charge and discharge test was performed for the evaluation battery obtained in Example 1. Specifically, the test was performed on the conditions of an environmental temperature of 25° C. and a voltage range of 10 mV to 2.5 V. The electric current value was determined at 6 mA/g. On the other hand, as Comparative Example 1, the charge and discharge test was performed in the same manner as Example 1 except for modifying the voltage range into 0.5 V to 2.5 V. Also, as Comparative Example 2, the charge and discharge test was performed in the same manner as Example 1 except for modifying the electric current value into 30 mA/g. The results are shown in FIGS. 4A and 4B. As shown in FIG. 4A, in Example 1, it was confirmed that a plateau appeared in the vicinity of 0.1 V in addition to the vicinity of 0.8 V. Also, an obtained reversible capacitance was approximately 110 mAh/g, and it may be confirmed that an extremely large capacitance was obtained. On the other hand, as shown in FIG. 4B, in Comparative Example 2, the plateau in the vicinity of 0.1 V was not confirmed. Also, the reversible capacitance of Comparative Examples 1 and 2 was approximately 50 mAh/g and approximately 60 mAh/g, respectively.

Example 2

The active material obtained in Example 1 and graphite (interlayer distance d002=3.36 Å, D/G ratio=0.12) were weighed at a weight ratio of active material:graphite=90:10, and a mixture thereof was put in a pot made of $ZrO_2$ and subjected to a ball milling process (180 rpm×24 hours). Thus, the active material with which the graphite was composited was obtained. An evaluation battery was obtained in the same manner as Example 1 except for using the obtained composited active material.

[Evaluation 2]
(SEM Observation)

SEM observation of the active material obtained in Example 2 was performed. The results are shown in FIG. 5. As shown in FIG. 5, in Example 2, it may be confirmed that the active material and the graphite were composited.

(Charge and Discharge Test)

Figure 6:
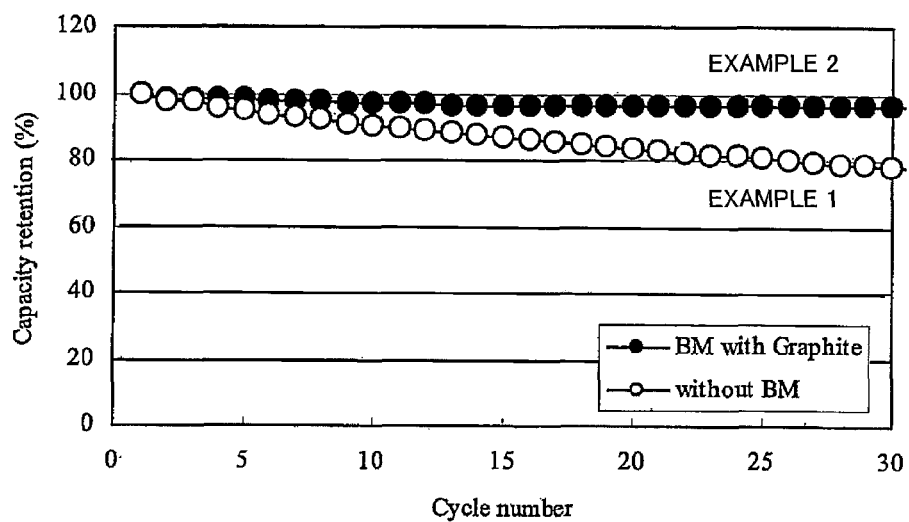
FIG. 6 is a result of a charge and discharge test of an evaluation battery obtained in Examples 1 and 2.

A charge and discharge test was performed for the evaluation battery obtained in Examples 1 and 2. The charging and discharging conditions are the same as the above. The results are shown in FIG. 6. As shown in FIG. 6, it may be confirmed that Example 2 is excellent in capacity retention as compared with Example 1. In Examples 1 and 2, the lower limit of the voltage range (the lower limit electric potential of Na insertion) is determined at 10 mV, so that it is conceived that the insertion of an Na ion changes the crystal structure of the $Na_2Ti_6O_{13}$ crystal phase. It is conceived that the change of the crystal structure causes an electron conduction path to be easily cut; however, it is conceived that the graphite in Example 2 is so high in crystallinity and so low in reactivity with an Na ion that the capacity retention becomes high.

REFERENCE SIGNS LIST

1 . . . cathode active material layer
2 . . . anode active material layer
3 . . . electrolyte layer
4 . . . cathode current collector
5 . . . anode current collector
6 . . . battery case
10 . . . sodium ion battery
20 . . . charge control unit
30 . . . sodium ion battery system

What is claimed is:

1. A sodium ion battery system comprising:
a sodium ion battery having a cathode active material layer containing a cathode active material, an anode active material layer containing an anode active material, and an electrolyte layer formed between the cathode active material layer and the anode active material layer; and
a charge control unit; wherein
the anode active material is an active material having an $Na_2Ti_6O_{13}$ crystal phase;
a ratio of the $Na_2Ti_6O_{13}$ crystal phase in all crystal phases contained in the anode active material is 50 mol % or more,
the charge control unit is configured to control electric current and electric potential of the anode active material so as to cause a second Na insertion reaction on a lower electric potential side in addition to a first Na insertion reaction in the $Na_2Ti_6O_{13}$ crystal phase, and $C_2/C_1$ is 0.3 or more, where capacity obtained by the first Na insertion reaction is $C_1$ and capacity obtained by the second Na insertion reaction is $C_2$.

2. The sodium ion battery system according to claim 1, wherein the charge control unit is configured to control the electric current to 6 mA/g or less.

3. The sodium ion battery system according to claim 1, wherein the charge control unit is configured to control the electric potential of the anode active material to 0.1 V (vs Na/Na$^+$) or less.

4. The sodium ion battery system according to claim 1, wherein the anode active material is composited with a conductive material.

5. A method for using a sodium ion battery having a cathode active material layer containing a cathode active material, an anode active material layer containing an anode active material, and an electrolyte layer formed between the cathode active material layer and the anode active material layer, wherein the anode active material is an active material having an $Na_2Ti_6O_{13}$ crystal phase, and a ratio of the NaiThOn crystal phase in all crystal phases contained in the anode active material is 50 mol % or more, the method comprising a step of:
- charging while controlling electric current and electric potential of the anode active material so as to cause a second Na insertion reaction on a lower electric potential side in addition to a first Na insertion reaction in the $Na_2Ti_6O_{13}$ crystal phase;
- wherein $C_2/C_1$ is 0.3 or more, where capacity obtained by the first Na insertion reaction is $C_1$ and capacity obtained by the second Na insertion reaction is $C_2$.

6. A method for producing a sodium ion battery having a cathode active material layer containing a cathode active material, an anode active material layer containing an anode active material, and an electrolyte layer formed between the cathode active material layer and the anode active material layer, wherein the anode active material is an active material having an $Na_2Ti_6O_{13}$ crystal phase in all crystal phases contained in the anode active material is 50 mol % or more, the method comprising a charging step of:
- charging while controlling electric current and electric potential of the anode active material so as to cause a second Na insertion reaction on a lower electric potential side in addition to a first Na insertion reaction in the $Na_2Ti_6O_{13}$ crystal phase;
- wherein $C_2/C_1$ is 0.3 or more, where capacity obtained by the first Na insertion reaction is $C_1$ and capacity obtained by the second Na insertion reaction is $C_2$.

* * * * *